United States Patent [19]

Morishita et al.

[11] Patent Number: 5,031,743
[45] Date of Patent: * Jul. 16, 1991

[54] DRIVING POWER TRANSMISSION

[75] Inventors: Nobunao Morishita, Okazaki; Toshifumi Sakai, Aichi; Tetsuya Nakano, Okazaki, all of Japan

[73] Assignee: Toyoda Koki Kabushiki Kaisha, Kariya, Japan

[ * ] Notice: The portion of the term of this patent subsequent to Mar. 6, 2007 has been disclaimed.

[21] Appl. No.: 302,904

[22] Filed: Jan. 30, 1989

[30] Foreign Application Priority Data

Jan. 29, 1988 [JP] Japan .................................. 63-16922
Jan. 29, 1988 [JP] Japan .................................. 63-16923

[51] Int. Cl.⁵ .................. F16D 43/28; F16D 25/0638; B60K 17/35
[52] U.S. Cl. .................. 192/58 C; 192/85 AA; 192/103 F; 74/650; 180/248
[58] Field of Search ............... 192/35, 57, 58 C, 85 R, 192/85 AA, 103 F; 74/710.5, 711, 650; 180/247, 248

[56] References Cited

U.S. PATENT DOCUMENTS

| | | | |
|---|---|---|---|
| 3,490,312 | 1/1970 | Seitz et al. | 74/711 |
| 3,628,399 | 12/1971 | Seitz et al. | 74/711 |
| 3,923,113 | 12/1975 | Pagdin | 192/57 X |
| 4,012,968 | 3/1977 | Kelbel | 74/711 |
| 4,031,780 | 6/1977 | Dolan et al. | 74/711 |
| 4,048,872 | 9/1977 | Webb | 74/711 |
| 4,058,027 | 11/1977 | Webb | 74/711 |
| 4,697,621 | 10/1987 | Diessner et al. | 141/1 |
| 4,719,998 | 1/1988 | Hiramatsu et al. | 192/0.033 |
| 4,727,966 | 3/1988 | Hiramatsu et al. | 192/103 F X |
| 4,730,514 | 3/1988 | Shikata et al. | 74/711 |
| 4,821,604 | 4/1989 | Asano | 192/103 F X |

FOREIGN PATENT DOCUMENTS 176117 12/1947 Japan .
60-252026 12/1985 Japan .

Primary Examiner—Richard Lorence
Attorney, Agent, or Firm—Oblon, Spivak, McClelland, Maier & Neustadt

[57] ABSTRACT

In a driving power transmission, an input shaft is coaxially rotatably carried in a closed cylinder housing, extending through an operating piston received therein. The operating piston is bodily rotatable with the housing and axially movable relative to the housing and the input shaft. The piston defines at opposite ends thereof a clutch chamber and an axially thin circular space. A multiple disc clutch operable by the piston is provided in the clutch chamber for selectively transmitting a torque from the input shaft to the housing acting as an output shaft. A rotor with diametrically opposite blades is received within the axially thin circular space and is rotatable bodily with the input shaft for compulsorily displacing silicon oil filled in the circular space, so as to generate a pressure therein when relative rotation occurs between the housing and input shaft. For improved performance of the transmission, there are specified the volume of air which together with the silicon oil, is filled up within the axially thin circular space and the volume of air which, together with a lubrication oil, is filled up within the clutch chamber.

7 Claims, 3 Drawing Sheets

DRIVING POWER TRANSMISSION

BACKGROUND OF THE INVENTION

1. Field of the Invention:

The present invention relates in general to a driving power transmission for transmitting rotational power from an input shaft to an output shaft and vice versa at the occurrence of the rotational speed difference between the input and output shafts and more particularly, to such a driving power transmission as particularly designed for incorporation in motor vehicles.

2. Discussion of the Prior Art:

As disclosed in U.S. Pat. No. 4,719,998 for example, there has been known a four-wheel drive vehicle of the type that a conventional oil pump is driven upon occurrence of a rotational speed difference between two coaxial drive shafts respectively connected to front and rear wheels and that a hydraulically operated clutch for effecting selective driving connection between the two drive shafts is operated in response to the discharge pressure from the oil pump corresponding to the rotational speed difference.

In a torque transmission device for the known four-wheel drive vehicle, the oil pump of plunger or vane type is interposed between the front and rear wheel drive shafts so as to discharge oil of the pressure corresponding to the rotational speed difference between the drive shafts. The pressurized oil from the pump is admitted into a cylinder chamber of the hydraulic clutch through a fluid passage formed in one of the drive shafts, so that the clutch can be hydraulically operated to drivingly connect the drive shafts with each other.

However, in the torque transmission device of the aforementioned type, the conventional oil pump interconnected between the front and rear drive shafts is relatively large in axial width thereof, and the fluid passage has to be provided for admitting the discharge pressure from the oil pump into the hydraulic clutch. This disadvantageously results in a complicated and large construction of the torque transmission device as well as in an increased cost for manufacturing.

SUMMARY OF THE INVENTION

In order to solve the foregoing problems, the Assignee of the present application has filed U.S. patent application Ser. No. 07/165,072 (filing date: Mar. 7, 1988) now U.S. Pat. No. 4,905,808, proposing an improved torque transmission device for a four-wheel drive vehicle. The proposed device comprises a multiple disc clutch disposed between a front drive shaft and a rear drive shaft for transmitting a torque therebetween and an operating piston for controlling the torque transmitted by the clutch. Further, in the device, an axially limited clearance or space is provided between the operating piston and a cylinder housing receiving the same, a thin rotor of approximately the same width as the space is contained in the space and is connected with one of the front and rear drive shafts while the cylinder housing is connected with the other thereof, a plurality of blades are formed radially of the rotor to divide the space circumferentially into several space sections, and a high viscous fluid is filled within the several space sections. The torque transmission device proposed in the aforementioned United States Application is advantageous in that it can be made small in size and can be simple in construction because no large space is required to incorporate therein means for generating a pressure applied to the operating piston. However, in the proposed device, the torque transmissive characteristic varies depending on the volume of air which, along with the high viscous fluid, is filled up within the space sections. More specifically, too little volume of air filled therein causes the high viscous fluid to expand due to temperature rise, thereby resulting in a sharp increase in the transmissive torque. Conversely, too much volume of air filled therein restrains the thermal expansion of the high viscous fluid, but permits the viscosity of the high viscous fluid to lower, thereby resulting in a sharp decrease in the transmissive torque. The volume of air filled within the space sections affects the variation in the transmissive torque with the temperature change of the high viscous fluid.

Further, the proposed device defines within the housing a closed clutch chamber containing the multiple disc clutch, and lubrication oil is filled in the closed clutch chamber. The temperature of the lubrication oil rises due to the heat which is generated by the friction between multiple clutch discs when the multiple disc clutch is continuously operated. Thus, too much volume of air filled within the clutch chamber causes the lubrication oil to easily rise to a high temperature and hence, to largely expand its volume. This results in pushing the operating piston back, whereby the pressuring power of the operating piston on the multiple clutch disc can be reduced to undesirably lower the transmissive torque. Conversely, too little volume of air filled within the clutch chamber results in insufficient lubrication between the clutch discs.

Accordingly, it is a primary object of the present invention to provide an improved driving power transmission of the previously proposed type wherein various drawbacks caused by too much or little volume of air which is filled together with a high viscous fluid within a rotor chamber can be obviated to secure a desired torque transmissive characteristic of the device.

Another object of the present invention is to provide an improved driving power transmission of the previously proposed type wherein various drawbacks caused by too much or little volume of air which is filled together with a lubrication oil within a clutch chamber can be obviated to secure a designed torque transmissive characteristic of the device as well as to prolong the life of the multiple clutch discs.

Briefly, according to the present invention, there is provided a driving power transmission of the type wherein a multiple disc clutch contained in a cylinder housing is arranged between the cylinder housing and a shaft coaxially rotatably carried in the same for transmitting a torque therebetween and wherein an operating piston is received in the housing to actuate the multiple disc clutch, thereby controlling the torque to be transmitted by the multiple disc clutch. The transmission defines between the operating piston and the cylinder housing an axially limited clearance or space, which rotatably receives axially thin blade means, and the space is filled with a high viscous fluid. Upon occurrence of relative rotation between the housing and the shaft, the blade is rotated relative to at least the operating piston so as to generate a pressure thanks to the viscosity of the fluid within the housing. Further, the axially limited space provides its effective space except for that occupied by the blade, and the effective space is filled up with the high viscous fluid and air occupying 10 to 20 percent of the volume thereof.

With this configuration, since the filling percentage of air within the effective space of the axially limited space, i.e. that not occupied by the blade, is specified to 10-20 percent of the volume an increase in torque which is caused by the interior pressure increase due to the rise of temperature can be offset with an decrease in torque which is caused by a decrease in the viscosity of the high viscous fluid, so that the resultant or total torque transmissive characteristic of the device can be maintained approximately constant over the whole range of variation in the temperature of the high viscous fluid.

In another aspect of the present invention, the housing also defines therein a closed clutch chamber which contains the multiple disc clutch. The filling percentage of air within the clutch chamber is specified to 20-30 percent of an effective volume of the clutch chamber. Thus, the excessive volume expansion of a lubrication oil which occupies the remaining percent of the effective volume of the clutch chamber can be restrained at high temperatures of the lubrication oil and the lubrication between clutch discs of the clutch can be sufficiently secured.

BRIEF DESCRIPTION OF THE ACCOMPANYING DRAWINGS

The foregoing and other objects, features and many of the attendant advantages of the present invention will be readily appreciated as the same becomes better understood by reference to the following detailed description of a preferred embodiment when considered in connection with the accompanying drawings, wherein like reference numerals designate identical or corresponding parts throughout the several views, and in which.

Figure 4:
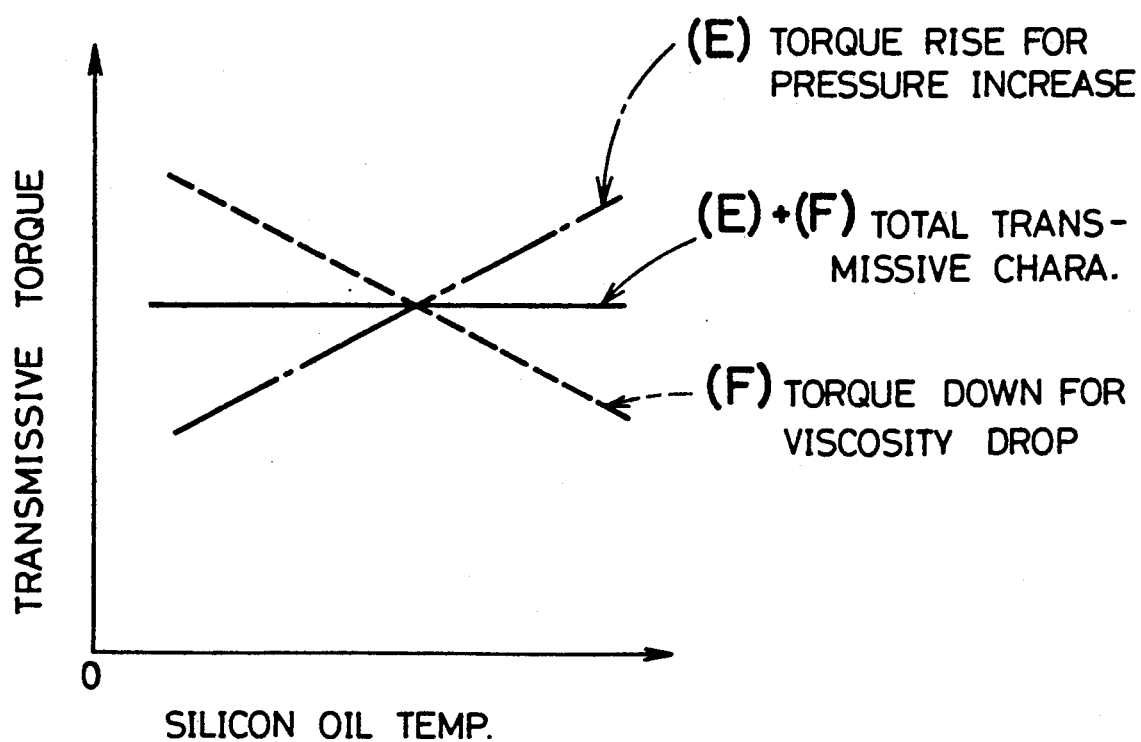
Figure 5:
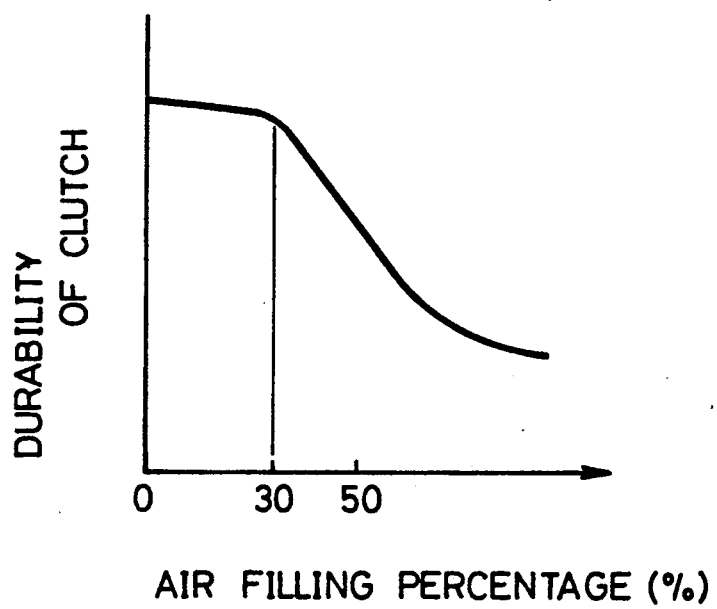

FIG. 4 is a graph illustrating that the increase in the transmissive torque due to the rise of the interior pressure of the rotor chamber is offset with the decrease in the transmissive torque due to the decrease in the viscosity of the high viscous fluid, so as to demonstrate the stability of the transmissive torque over the changes in the temperature of the high viscous fluid; and FIG. 5 is a graph showing the relationship between the filling percentage of air within a clutch chamber and the durability of multiple clutch discs.

DETAILED DESCRIPTION OF A PREFERRED EMBODIMENT

Figure 1:
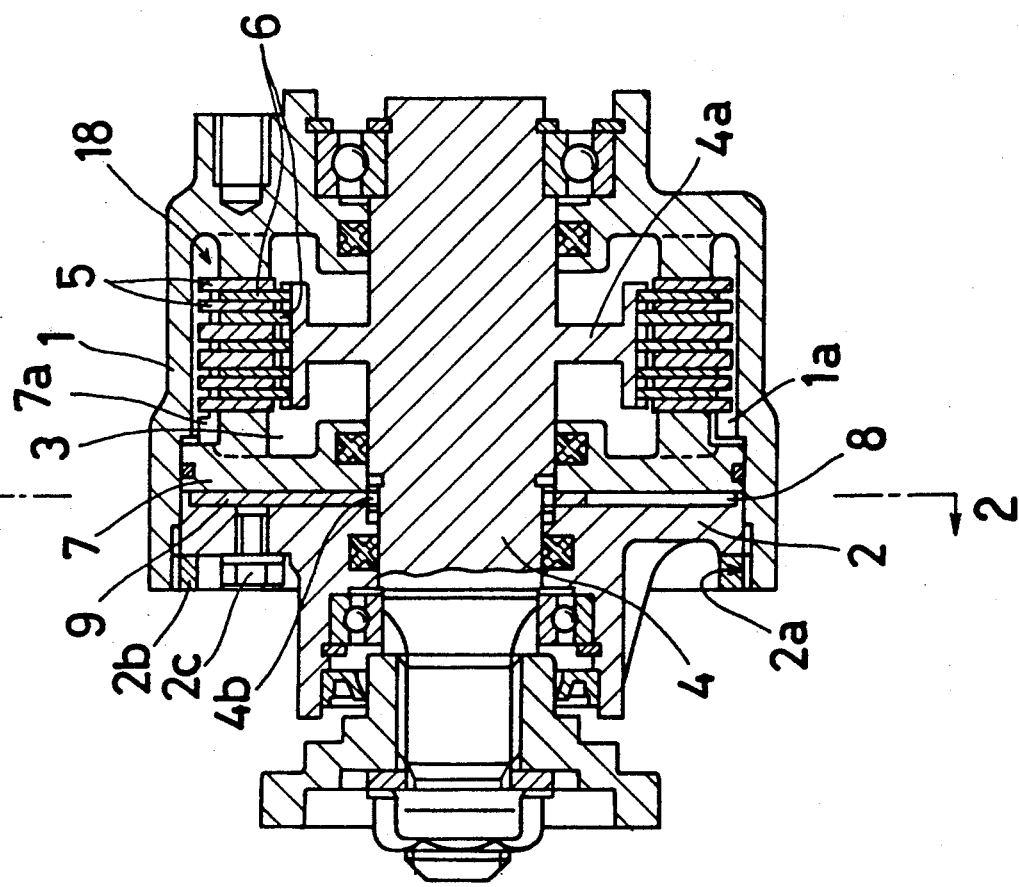
FIG. 1 is a longitudinal sectional view of a driving power transmission to the present invention.

Referring now to the drawings and particularly to FIG. 1 thereof, a driving power transmission according to the present invention is illustrated comprising a rotary cylinder housing 1 which acts as an output shaft connected to, for example, a rear drive shaft of a four-wheel drive vehicle (not shown), as described in grater detail in the aforementioned United States Application of the same assignee as the present application. The housing 1 has at only one axial end thereof an opening, in which an end cap 2 is fitted so as to define a closed housing. A screw portion 2a of the housing 1 and a ring nut 2b secure the bodily rotation of the end cap 2 with the housing 1.

An input shaft 4 is rotatably carried by the housing 1 and the cap 2 and extends in coaxial relation therewith. The input shaft 4 is connectable to the front drive shaft at its one end. The closed housing 1 slidably receives a clutch operating piston 7, which is also slidable on the input shaft 4. The external and internal surfaces of the piston 7 are in fluid tight relation respectively to the housing 7 and the input shaft 4. The piston 7 defines at one side thereof a closed clutch chamber 3, which is filled with a clutch lubrication oil. Within the clutch chamber 3, a number of outer clutch discs 5 are spline-engaged with the internal surface of the housing 1 for bodily rotation and are axially juxtaposed for axial movement. A number of inner clutch discs 6 are spline-engaged with a clutch hub 4a formed on the input shaft 4 for bodily rotation and are axially juxtaposed for axial movement. These outer and inner clutch discs 5, 6 are arranged in an alternate fashion in the axial direction to constitute a so-called multiple disc clutch 18.

The clutch operating piston 7 is in position to be able to directly act on the multiple disc clutch 18, so that the power of the operating piston 7 is applied to the multiple disc clutch 18. A protrusion 7a of the piston 7 is engaged with a spline 1a of the housing 1, so that the piston 7 is bodily rotatable with the housing 1 but axially slidable relative to the housing 1 and the input shaft 4.

Figure 2:
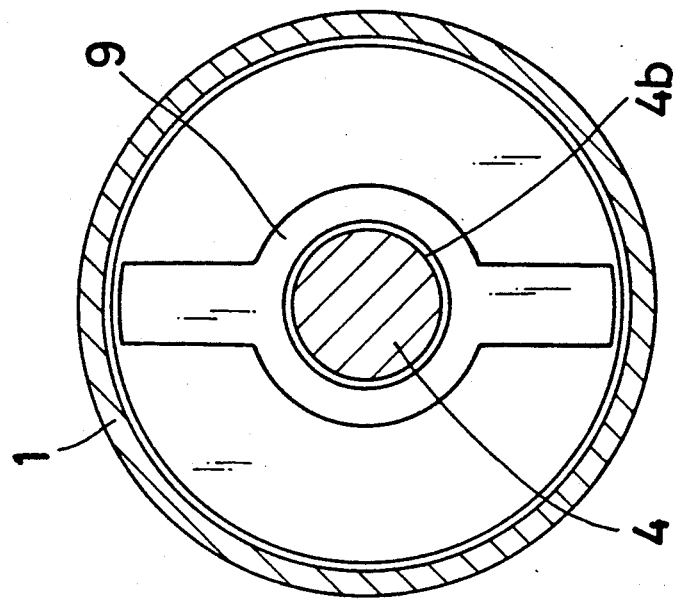
FIG. 2 is a cross-sectional view of the device, taken along the line 2—2 in FIG. 1.

Between the operating piston 7 and the end cap 2, there is defined a limited or thin axial clearance (space) 8, within which is rotatably provided a thin rotor 9 having approximately the same axial width as the space 8. As shown in FIG. 2, the rotor 9 is formed with a pair of diametrically extending blades (not numbered) and is spline-engaged with a spline 4b formed on the external surface of the input shaft 4 at its central portion. It is to be noted that in a modified form of the invention, the rotor 9 may be spline-engaged not with the input shaft 4, but with the internal surface of the housing 1 at its external surfaces of the blades, in which case at least one of the end cap 2 and the operating piston 7 or both thereof may be drivingly connected with the input shaft 4 for bodily rotation thereof. The space 8 is of a circular closed type and is filled with a high viscous fluid such as, for example, silicon oil.

In the present invention, the space 8 receiving the rotor 9 provides its effective space which is that space not occupied by the rotor 9, and the effective space is filled up with air of by ten (10) to twenty (20) percent of its volume and the high viscous fluid of filling the remaining volume. A plug 2c is threadedly disengageable from the end cap 2 for filling the effective space of the space 8 with the high viscous fluid and air of the respectively specified volume percents. Further, the clutch chamber 3 has an effective clutch chamber, which is that volume not occupied by the clutch 18, and the effective clutch chamber is filled up with air of twenty (20) to thirty (30) percent of the volume and the lubrication oil of the remaining volume. Another plug (not shown) which is threadedly removable from the housing 1 is provided for filling the clutch chamber 3 with the lubrication oil. That is, the filling percentage of air within the effective space is specified to 10-20 percent in volume, while the filling percentage of air within the effective clutch chamber is specified to 20-30 percent in volume.

The operation of the device as constructed above will be described hereinafter.

When no relative rotation occurs between the input shaft 4 and the housing 1 acting as the output shaft, the high viscous fluid does not generate any interior pressure within the space 8 receiving the rotor 9, and thus, no power is generated to pressure the operating piston 7 upon the multiple disc clutch 18. Therefore, the outer clutch discs 5 slip on the inner clutch discs 6 and do not perform torque transmission, so that the four-wheel drive vehicle remains in a two-wheel drive mode wherein the front or rear wheels only are active for drive.

However, when a rotational speed difference occurs between the input shaft 4 and the housing 1, the rotor 9 is rotated within the space 8 relative to the end cap 2, operating piston 7 and the housing 1. Thus, the high viscous fluid filled within the space 8 is compulsorily displaced by the blades of the rotor 9 between two adjacent end surfaces at a flow rate corresponding to the rotational speed difference. As a result, the high viscous fluid generates a pressure within the space 8, thanks to its viscous friction with the facing end surfaces of the end cap 2 and the operating piston 7. This interior pressure axially moves the operating piston 7 to make a driving engagement of the multiple clutch discs 5 and 6, whereby a power is transmitted from the input shaft 4 to the housing 1. Thus, the vehicle shifts to a four-wheel drive mode wherein all of the front and rear wheel are brought into active for drive.

In this manner, when rotation of the rotor 9 within the space 8 causes an interior pressure to be generated continuously thanks to the high viscous fluid, the temperature of the high viscous fluid rises. However, because air of 10-20 percent of the volume is filled within the effective space of the rotor space 8, there does not occur a large variation in the transmissive torque even in the temperature changes of the high viscous fluid.

Figure 3:
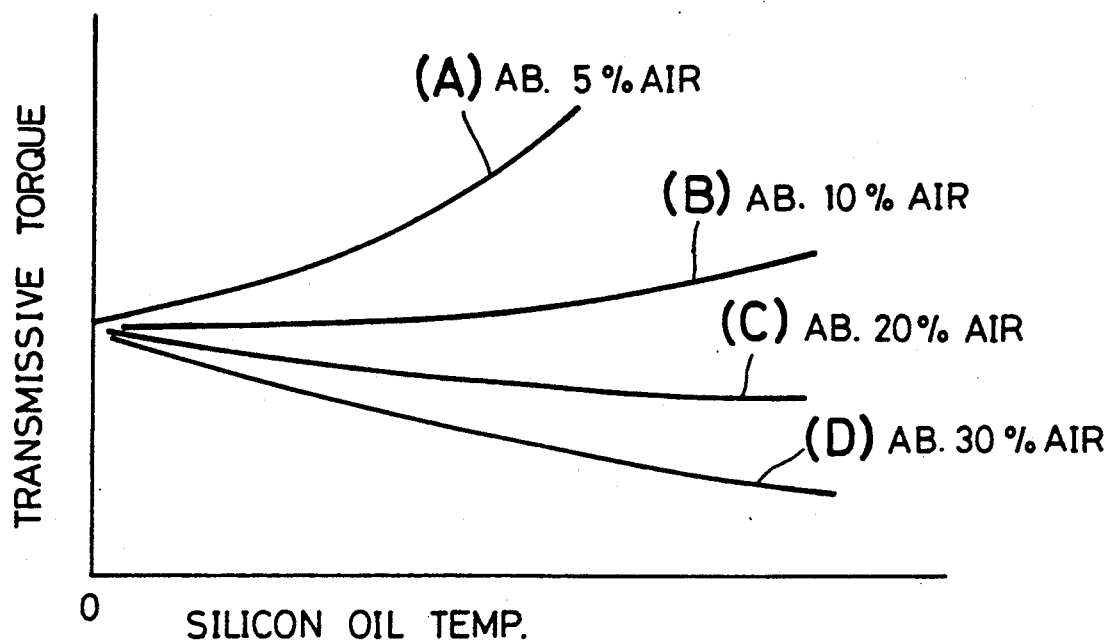
FIG. 3 is a graph showing the variation of a transmissive torque in connection with changes in the temperature of a high viscous fluid filled within a rotor chamber as well as changes in the volume percentage of air filled within the rotor chamber.

The reasons are demonstrated by the experimental data shown, in FIG. 3. That is, where air of about five (5) percent of the volume was filled as indicated by Curve (A), the high viscous fluid caused the transmissive torque to rise sharply due to thermal expansion resulting from temperature increase. Where air of about thirty (30) percent of the volume was filled as indicated by Curve (D), the transmissive torque decreased sharply due to the lowering of the viscous fluid in viscosity. However, in the case of about ten (10) percent of the volume being air as well as in the case of about twenty (20) percent of the volume being air as respectively indicated by Curves (B) and (C), the transmissive torque was relatively stable irrespective of changes in the silicon oil temperature. Thus, it was found that air volume ranging 10-20 percent is favorable.

Furthermore, in the case of the air volume in the 10-20percent range, as the temperature of silicon oil rose, the increase in the transmissive torque due to thermal expansion of silicon oil (Curve (E)) was offset with that due to the lowering of silicon oil in viscosity (Curve F), and the total transmissive characteristic (Curve (E)+(F)) plotting these offset points became approximately flat over the whole variation range of the silicon oil temperature.

On the other hand, when the multiple disc clutch 18 continues to be active, the friction between the outer and inner clutch discs 5, 6 causes the temperature of the lubrication oil within the clutch chamber 3 to rise. However, because the volume of air filled within the clutch chamber 3 ranges from 20 to 30 percent in volume of the effective space of the clutch chamber 3, the thermal expansion of the lubrication oil due to the rise of temperature is restrained as little as possible and the lubrication for the multiple disc clutch 18 is adequately secured.

In light of avoiding that the transmissive torque being lowered due to the thermal expansion of the lubrication oil at high temperatures, a higher filling rate of air may be considered more effective. However, from the results of experiments, it was found that the relationship between the air filling rate and the durability of the clutch 18 taken in view of the lubrication between the clutch discs 5 and 6 could be represented by the graph shown in FIG. 5. That is, where the filling volume percentage of air within the clutch chamber 3 exceeded 30 percent of the effective space thereof, the lubrication effect on the clutch discs was sharply deteriorated, thereby harming the durability of the clutch 18, and therefore, the best filling volume percentage was considered to range 20 to 30 percents of the effective space of the clutch chamber 3.

Obviously, numerous modifications and variations of the present invention are possible in light of the above teachings. It is therefore to be noted that within the scope of the appended claims, the present invention may be practiced otherwise than as specifically described herein.

What is claimed is:

1. A driving power transmission for a motor vehicle for transmitting a torque between input and output shafts thereof, comprising:
   a cylinder housing acting as one of said input and output shafts;
   a shaft coaxially rotatably carried in said cylinder housing and acting as the other of said input and output shafts;
   a multiple disc clutch provided in said housing and including a plurality of inner and outer clutch discs which are selectively engageable with each other for transmitting rotation between said housing and said shaft;
   an operating piston axially movably received in said housing for bringing said inner and outer clutch discs into driving engagement with each other, said operating piston defining within said cylinder housing a closed clutch chamber containing said multiple disc clutch;
   end surface means cooperating with an end surface of said operating piston for defining an axially thin space therebetween;
   axially thin blade means received in said axially thin space for rotation about the axis of said shaft; and
   means for rotating said blade means relative to said operating piston and said end surface means when relative rotation occurs between said housing and said shaft;
   said axially thin space being filled up with a high viscous fluid occupying 80 to 90 volume percent of a part of the total volume of said axially thin space not occupied by said blade means, and air occupying the remainder of said part, thereby the transmissive torque of said multiple disc clutch being prevented from changing due to temperature increase of said fluid.

2. A driving power transmission as set forth in claim 1, wherein:

said clutch chamber is filled up with a lubrication oil occupying 70 to 80 volume percent of a part of the total volume of said clutch chamber not occupied by said multiple disc clutch, and air occupying the remainder of said part.

3. A driving power transmission as set forth in claim 2, wherein:
said high viscous fluid consists of silicon oil.

4. A driving power transmission for a motor vehicle for transmitting a torque between input and output shafts thereof, comprising:
a cylinder housing acting as one of said input and output shafts;
a shaft coaxially rotatably carried in said cylinder housing and acting as the other of said input and output shafts;
a multiple disc clutch provided in said housing and including a plurality of inner and outer clutch discs which are selectively engageable with each other for transmitting rotation between said housing and said shaft;
an operating piston axially movably received in said housing for bringing said inner and outer clutch discs into driving engagement with each other, said operating piston defining within said cylinder housing a closed clutch chamber containing said multiple disc clutch;
end surface means cooperating with an end surface of said operating piston for defining an axially thin space therebetween;
axially thin blade means received in said axially thin space for rotation about the axis of said shaft; and
means for rotating said blade means relative to said operating piston and said end surface means when relative rotation occurs between said housing and said shaft;
said axially thin space being filled up with a high viscous fluid, and said clutch chamber being filled up with a lubrication oil occupying 70 to 80 volume percent of a part of the total volume of said clutch chamber not occupied by said multiple disc clutch and air occupying the remainder of said part, thereby the transmissive torque of said multiple disc clutch being prevented from decreasing due to temperature increase of said oil.

5. A driving power transmission as set forth in claim 4, wherein:
said axially thin space is filled up with said high viscous fluid occupying 80 to 90 volume percent of a part of the total volume of said axially thin space not occupied by said blade means, and air occupying the remainder of said part.

6. A driving power transmission as set forth in claim 5, wherein:
said high viscous fluid consists of silicon oil.

7. A driving power transmission for a motor vehicle for transmitting a torque between input and output shafts thereof, comprising:
a closed cylinder housing acting as one of said input and output shafts;
a shaft coaxially rotatably carried in said cylinder housing and acting as the other of said input and output shafts;
a multiple disc clutch provided in said housing and including a plurality of inner and outer clutch discs which are selectively engageable with each other for transmitting rotation between said housing and said shaft;
an operating piston rotatable bodily with said housing and axially movable relative thereto for bringing said inner and outer clutch discs into driving engagement with each other, said operating piston being received in said housing for defining at opposite ends thereof a closed clutch chamber containing said multiple disc clutch and an axially thin circular space;
axially thin blade means received in said axially thin space and rotatable bodily with said shaft for displacing a high viscous fluid filled in said axially thin circular space against viscous contact with said cylinder housing and said operating piston upon occurrence of relative rotation between said cylinder housing and said shaft; and
said clutch chamber being filled up with a lubrication oil occupying 70 to 80 volume percent of a part of the total volume of said clutch chamber not occupied by said multiple disc clutch and air occupying the remainder of said part, said axially thin space being filled up with a high viscous fluid occupying 80 to 90 volume percent of a part of the total volume of said axially thin space not occupied by said blade means and air occupying the remainder of said part of said axially thin space, thereby the transmissive torque of said multiple disc clutch being prevented from changing due to temperature increase of said oil.

* * * * *